United States Patent
Zou et al.

(10) Patent No.: US 7,560,030 B2
(45) Date of Patent: Jul. 14, 2009

(54) METHOD FOR SEPARATION AND ENRICHMENT OF PHOSPHOPEPTIDES

(75) Inventors: Hanfa Zou, Liaoning (CN); Houjiang Zhou, Liaoning (CN); Mingliang Ye, Liaoning (CN); Shun Feng, Liaoning (CN)

(73) Assignee: Dalian Institute of Chemical Physics, Chinese Academy of Sciences, Liaoning (CN)

( * ) Notice: Subject to any disclaimer, the term of this patent is extended or adjusted under 35 U.S.C. 154(b) by 0 days.

(21) Appl. No.: 11/772,370

(22) Filed: Jul. 2, 2007

(65) Prior Publication Data

US 2008/0006581 A1 Jan. 10, 2008

(30) Foreign Application Priority Data

Jul. 5, 2006 (CN) .................. 2006 1 0047124

(51) Int. Cl.
*B01D 15/08* (2006.01)
(52) U.S. Cl. ................ 210/656; 210/635; 210/638; 210/198.2; 530/413; 530/416; 530/417
(58) Field of Classification Search ........... 210/198.2, 210/635, 638, 656; 530/413, 416, 417
See application file for complete search history.

(56) References Cited

U.S. PATENT DOCUMENTS

| | | | | |
|---|---|---|---|---|
| 5,780,593 | A * | 7/1998 | Lihme et al. ............ | 530/361 |
| 6,623,655 | B1 * | 9/2003 | Kappel et al. ........... | 252/1 |
| 6,878,838 | B2 * | 4/2005 | Lin et al. ............... | 556/14 |
| 2003/0129769 | A1 * | 7/2003 | Regnier ................. | 436/518 |
| 2003/0186326 | A1 * | 10/2003 | Regnier et al. .......... | 435/7.1 |
| 2004/0069953 | A1 * | 4/2004 | Sylvester ............... | 250/423 R |
| 2006/0054559 | A1 * | 3/2006 | Liu et al. .............. | 210/656 |
| 2007/0227974 | A1 * | 10/2007 | Anders et al. .......... | 210/638 |

OTHER PUBLICATIONS

Katz, H.E., et al., "Quaterthiophenediphosphonic (QDP): A Rigid, Electron-Rich Building Block for Zirconium-Based Multilayers", Chemistry of Materials, 1991, pp. 699-703.
Nonglation, Guillaume et al, "New Approach to Oligonucleotide Microarrays using Zirconium Phosphonate-Modified Surfaces", Journal of the American Chemical Society, 2004, pp. 1497-1502.

* cited by examiner

*Primary Examiner*—Ernest G Therkorn
(74) *Attorney, Agent, or Firm*—Smith, Gambrell & Russell, LLP

(57) ABSTRACT

The present invention relates to phosphopeptide isolation and enrichment, particularly to a highly selective and specific phosphopeptide enrichment method. The method mentioned in the invention is based on the strong interaction between zirconium phosphonate and phosphopeptide. Zirconium phosphonate is immobilized on the surface of matrix for phosphopeptide enrichment. Zirconium phosphonate could be immobilized on chip surface, it can also be immobilized on chromatographic matrix for isolation and purification of phosphopeptides. The method shows high specificity for phosphopeptides, it can be applied to purify and enrich low abundance phosphopeptide from biological samples.

5 Claims, 6 Drawing Sheets

METHOD FOR SEPARATION AND ENRICHMENT OF PHOSPHOPEPTIDES

CROSS-REFERENCE TO RELATED APPLICATIONS

This application claims the benefit of Chinese Patent Application Serial No. 200610047124.0, filed 5 Jul. 2006, which is herein incorporated by reference.

FIELD OF THE INVENTION

The invention relates to separation and enrichment of phosphopeptides, specifically, a method for highly selective and specific isolation and enrichment of phosphopeptides, which is applied to analysis of protein phosphorylation. Besides, the invention also provides the method to prepare matrix with zirconium phosphonate modified surface.

BACKGROUND OF THE INVENTION

Post-translational modifications of protein are hot theme in proteomic study.

Protein phosphorylation is a common and very important post translation of modification of protein. The phosphorylation and dephosphorylation of protein regulate nearly every aspects of cellular life including cell proliferation, development and differentiation, nerve activity, muscle shrinkage, metabolism and tumor progression etc. Protein phosphorylation and dephosphorylation also is well known as primary signal transduction pathway.

Traditional analysis methods of protein phosphorylation such as radio isotope labeling, Edman degradation and thin layer chromatography are often time-consuming. These methods not only need complicated manipulation, skilled-operator and large amount of proteins, but also have potential radioactivity danger. Nowadays mass spectrometry has been developed as one of the most powerful tool for analysis of protein phosphorylation. Identification of phosphoprotein by mass spectrometry is still a huge challenge. This is because, firstly, the phosphoprotein is often low abundance in cellular proteins; secondly, the negative charge of phosphopeptide is very difficult to ionization during mass spectrometric detection; and thirdly, the signals of phosphopeptides are often greatly suppressed by lots of non-phosphopeptides in the tryptic digest. Therefore, it is very difficult to directly apply mass spectrometer to analyze phosphopeptides in complex tryptic digest. So isolation and enrichment of phosphopeptides from complex peptides prior to mass spectrometry analysis is required.

By far, immobilized metal affinity chromatography (IMAC) is widely applied to enrich and isolate phosphopeptide. With IMAC technology, the chelating groups such as the iminodiacetic acids are often covalent linked to chromatography media, then metal ions (usually $Fe^{3+}$ or $Ga^{3+}$) are immobilized on the chromatography media because of strong chelation. The isolation of phosphopeptides with IMAC is achieved by the strong interaction between the phosphate groups on the phosphopeptides and the immobilized metal ions. However, an obvious disadvantage of this approach is its low specificity as some of acidic non-phosphopeptides are also retained. Those non-phosphopeptides may seriously suppress the detection of phosphopeptide. To improve specificity of phosphopeptide isolation, $TiO_2$ and $ZrO_2$ microparticle packed micro column, $Al(OH)_3$ and $Fe_3O_4/TiO_2$ core/shell nanoparticles were recently used to enrich and isolate phosphopeptides.

Reference 1 (Katz, H. E. et al., "Quaterthiophenediphosphonic (QDP): A Rigid, Electron-Rich Building Block for Zirconium-Based Multilayers", *Chemistry of Materials*, P 699-703 (1991)) disclosed the method for the preparation of single or multi-layers of zirconium phosphonate surface by making use of the interaction between zirconium ion and phosphonate group. Also, Reference 2 (Guillaume Nonglation et al., "New approach to Oligonucleotide Microarrays Using Zirconium Phosphonate-Modified Surfaces", *Journal of American Chemical Society*, P 1497-1502 (2004)) reported a method to prepare DNA microarray by taking advantage of the strong interaction between zirconium phosphonate and phosphonate group. Unfortunately, there is no literature describing or revealing the phosphopeptide isolation and enrichment method based on the strong interaction between zirconium phosphonate and phosphate groups.

SUMMARY OF THE INVENTION

The purpose of this invention is to provide a new method, based on the interaction between zirconium phosphonate and phosphopeptide, for highly selective and specific isolation and enrichment of phosphopeptides.

In order to realize the purposes above-mentioned, the applicant of the invention carefully investigated the interaction between zirconium phosphonate and phosphopeptide and found that the immobilized zirconium ion have strong chelating interaction with phosphopeptide. Based on the unique strong chelating interaction, phosphopeptide can be specifically retained on the zirconium phosphonate modified surface. The technical scheme of this invention is as follows:

Zirconium phosphonate is immobilized on matrix surface for isolation and enrichment of phosphopeptides. The preparation of zirconium phosphonate modified matrix surface comprises two steps. The phosphate group is first covalently linked to the matrix by chemical reactions and then zirconium ion is immobilized by the strong interaction between zirconium ion and phosphonate group. The isolation and enrichment of phosphopeptides mainly comprises three steps: 1) loading an peptide mixture containing phosphopeptides, phosphopeptides are retained on the zirconium phosphonate modified matrix by incubation with the peptide mixture containing phosphopeptides 2) washing, non-retained and non-specifically retained non-phosphopeptides are removed by washing with suitable solvents; 3) elution, the retained phosphopeptides are eluted.

Wherein chip is used as the matrix, zirconium phosphonate is immobilized on the surface of the chip for phosphopeptide enrichment and isolation. In chip mode, the sample containing phosphopeptides are deposited on the chip surface and the phosphopeptides were enriched by the chip. These captured phosphopeptides could be eluted for analysis or be directly detected on-site by MALDI-TOF MS. The on-site approach prevents sample loss and it is applicable to analyze minute phosphopeptides.

Wherein the matrix can be chromatographic media, zirconium phosphonate is immobilized on chromatographic media as stationary phase for isolation and enrichment of phosphopeptides. In chromatographic media mode, zirconium phosphonate modified media could be used as chromatographic packing materials for enrichment of phosphopeptides. As this approach has high sample loading capacity, it is more suitable for separation and purification of large amount of phosphopeptides.

In summary, the invention is a new method of enrichment and isolation of phosphopeptide from complex mixture of peptides based on strong interaction between zirconium phosphonate and phosphopeptide. This method has high specificity and can be used to isolate and enrich low abundance phosphopeptides from biological samples.

DESCRIPTION OF THE INVENTION IN DETAIL

The present invention provided a new method for high specific enrichment of phosphopeptides. The main characteristic of this invention is that the enrichment method is based on the strong interaction between zirconium phosphonate and phosphopeptide. In application, the method has two modes, i.e. the chip mode and the chromatographic media mode. In the chip mode, zirconium phosphonate is immobilized on the surface of chip, and therefore phosphopeptide is specifically retained on the chip surface and isolated. In the chromatography media mode, zirconium phosphonate was immobilized on the chromatographic media, and phosphopeptide is specifically retained on the media surface and also isolated. All detailed embodiments are shown as follows.

1. Zirconium Phosphonate Modified Chip for Enrichment of Phosphopeptides

Figure 1:
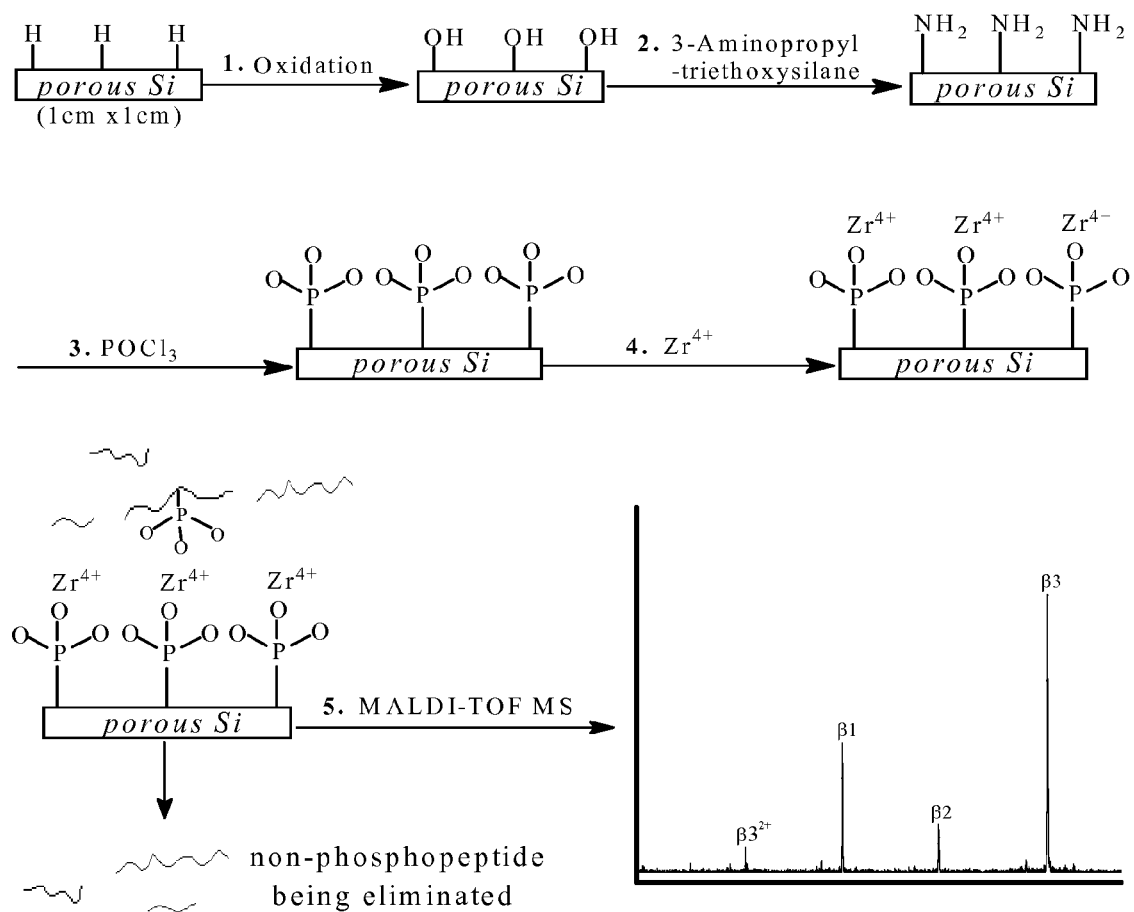
FIG. 1 is the scheme for the preparation of zirconium phosphonate modified porous silicon and its application for phosphopeptide enrichment followed with MALDI detection.

The surface of chip modified with zirconium phosphonate is applied to enrich and isolate phosphopeptides. Zirconium phosphonate modified porous silicon chip was taken as an example to demonstrate the phosphopeptide enrichment method of this invention. The captured phosphopeptides were detected by MALDI-TOF MS. FIG. 1 gives the procedures for the preparation of zirconium phosphonate modified porous silicon chip and the isolation and detection of phosphopeptides from complex mixture of peptides. The method comprising the steps of: (a) obtaining zirconium phosphonate modified porous silicon chip; (b) phosphopeptide is captured by zirconium phosphonate modified porous silicon chip; (c) the captured phosphopeptides are detected by MALDI-TOF MS. In this example, chip material is silicon wafer, but other materials such as polymer, quartz, glass and metal are also used. In this example, MALDI-TOF MS is chosen as the detection method. But the detection method is not limited to MALDI-TOF MS, others detection methods such as fluorescence detection, electrochemical detection may be also used. Although single spot chip is used in this example, this invention is also applicable to array chip.

EXAMPLE 1

Enrichment and Purification of Phosphopeptides Using Zirconium Phosphonate Modified Porous Silicon Chip (1) Preparation of Zirconium Phosphonate Modified Porous Silicon Chip A low-resistivity silicon wafer was tailed to 1 cm×1 cm pieces, which were electrochemically etched in a solution of ethanol/49% HF (2:3, v/v) for 100 s in a custom-built Teflon cell, with a Pt wires as cathode electrode and porous silicon anode electrode under the illumination of a 250 W tungsten filament bulb. The current density was kept at 4 mA/cm$^2$. The obtained silicon wafer was further processed by rapid oxidation with 30% $H_2O_2$ for 1 min and then re-etched in ethanol containing 5% HF (v/v) for 60 s. The surface of the porous silicon wafer was ready for use after washing with ethanol. The freshly etched porous silicon was incubated in 50 mL 20% $HNO_3$ for 2 h. After rinsing with water, porous silicon was placed in 60 mL 20% HCl at 80° C. with stirring for 6 h. It was rinsed with water until pH at 7.0. Then, pieces of the porous silicon wafer were dried in vacuum at 110° C. overnight. The dried porous silicon wafer was placed in 60 mL toluene under $N_2$ and subsequently 6 mL 3-aminopropyl-triethoxysilane was added for reaction at 110° C. for 12 h under $N_2$. Then the toluene was filtered and the obtained aminopropyl-terminated porous silicon surface was washed with toluene and acetone for several times. The obtained aminopropyl modified porous silicon surface was further transferred into phosphonate-terminated porous silicon surface with reaction in a solution of 40 mM $POCl_3$ and 40 mM 2,4,6-collidine in anhydrous acetonitrile for 12 h, and followed by rinsing with ACN and water. The resulting surface was immersed into 20 mM $ZrOCl_2$ solution to yield the zirconium phosphonate modified porous silicon wafer (ZrP-pSi) at room temperature overnight under gentle stirring. After that, the surface of zirconium phosphonate modified porous silicon wafer was rinsed with deionized water for several times and stored in the refrigerator at 4° C. for usage.

(2) Sample Preparation

α-Casein and β-casein (1 mg) was respectively dissolved in 1 mL ammonium bicarbonate (50 mM, pH 8.2) and digested for 16 h at 37° C. with an protein-to-enzyme ratio of 40:1 (w/w). The protein digest solution was lyophilized by a vacuum concentrator and then stored in the freezer under −30° C. for further usage.

(3) Enrichment of Phosphopeptide Followed with MALDI-TOF MS Analysis

The obtained ZrP-pSi chip was firstly washed with 5 μL of 200 mM NaCl solution to remove the compounds non-specifically adsorbed on porous silicon wafer surface. The tryptic digestion of phosphoprotein was respectively dissolved with 100 μL solution of 50% ACN containing 0.1% TFA and 100 mM NaCl (pH 2~3) as loading solution, then 2 μL loading solution was directly deposited onto the ZrP-pSi wafer for incubation about 15 min. After that, the ZrP-pSi wafer was washed by 1 mL 50% ACN solution containing 100 mM NaCl and 0.1% TFA for 5 min, and followed by washing with 1 mL 50% ACN solution for 5 min, and then washed by deionzied water to remove salts and non-specifically adsorbed compounds. Lastly, 2 μL of DHB (25 mg/mL) solution containing 1% $H_3PO_4$ was added onto the ZrP-pSi wafer to form the cocrystal with the trapped phosphopeptides. The ZrP-pSi wafer was directly attached to the MALDI target plate with conductive tape for the further mass spectrometric analysis.

All MALDI-TOF mass spectrometry experiments were performed on a Bruker Autoflex time-of-flight mass spectrometer (Bruker, Bremen, Germany). This instrument was equipped with a delayed ion-extraction device and a pulsed nitrogen laser operated at 337 nm. All mass spectra reported were obtained in the positive ion linear mode with delayed extraction for 90 ns and calibrated using an external calibration equation generated from the ion signal of angiotension II and insulin chain B. And each mass spectrum was typically summed with 30 laser shots.

(4) Analytical Results

Figure 2:
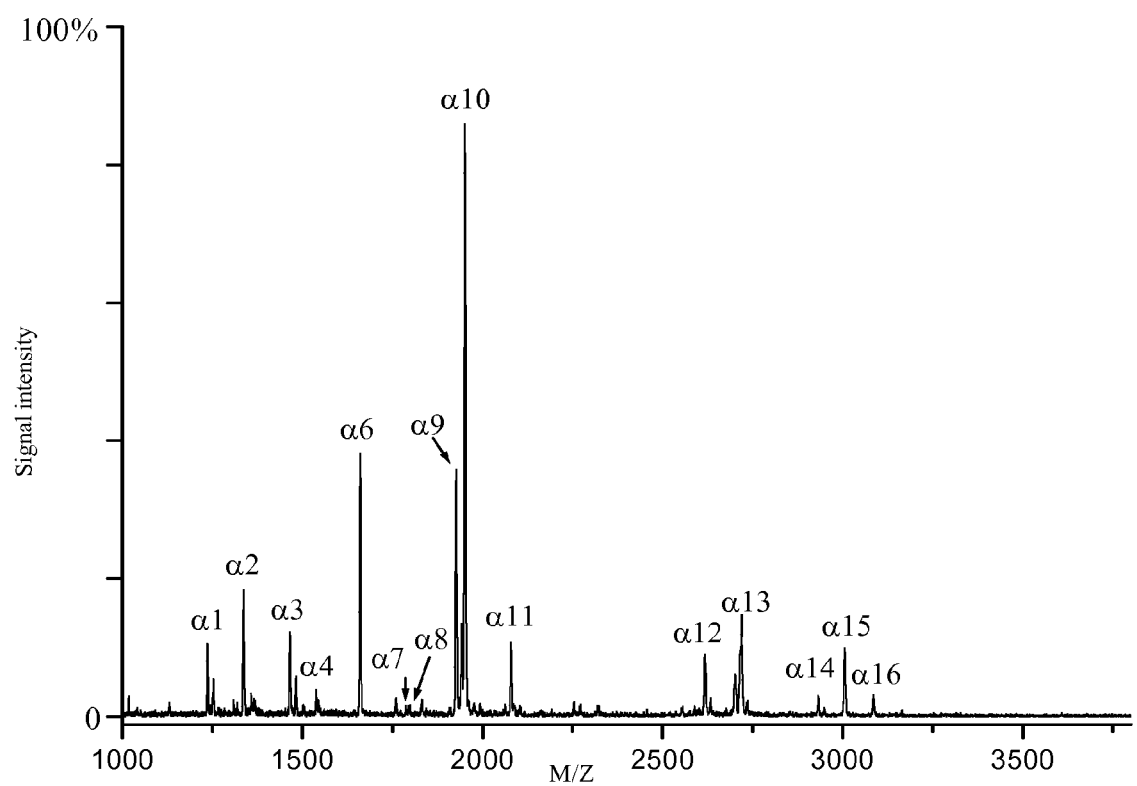
FIG. 2 is the MALDI mass spectrum of the enriched phosphopeptides captured by zirconium phosphonate modified porous silicon chip from tryptic digests of α-casein. The sequence and the phosphorylation sites of the phosphopeptides are listed in Table 1.
Figure 3:
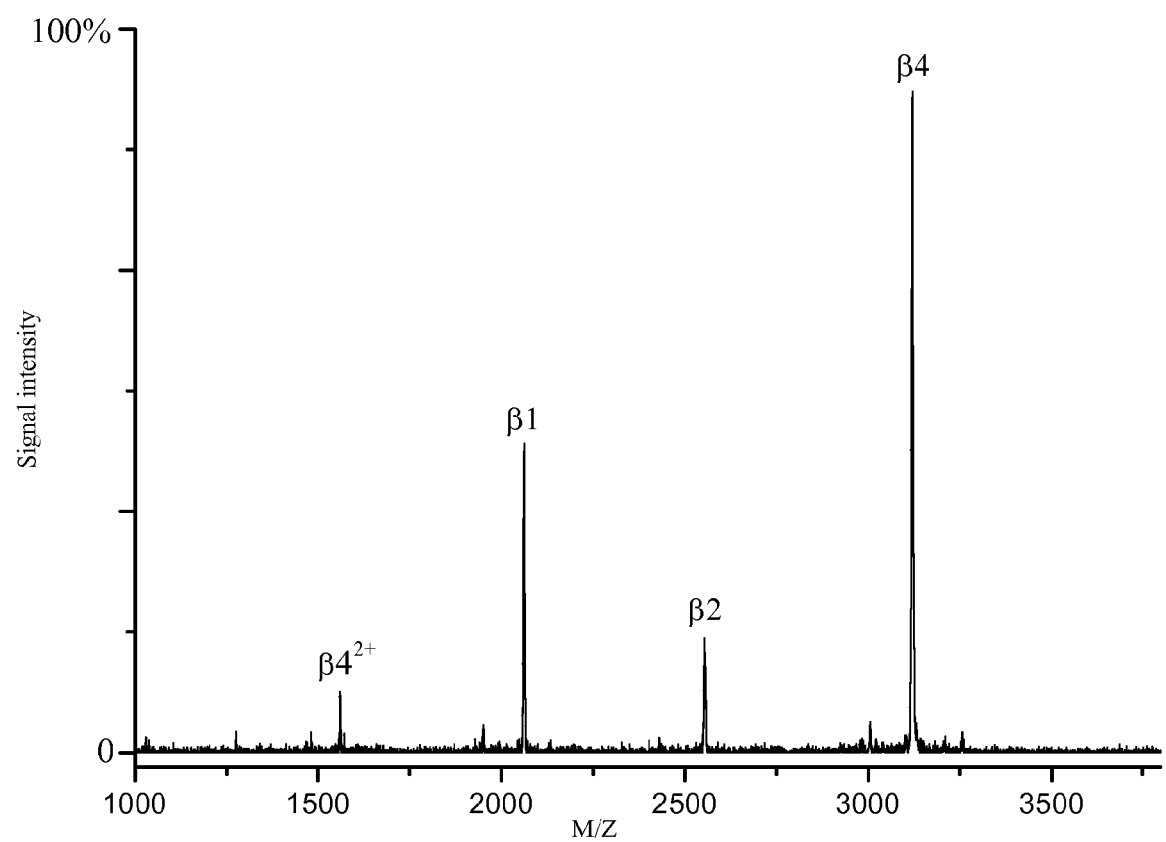
FIG. 3 is the MALDI mass spectrum of the enriched phosphopeptides captured by zirconium phosphonate modified porous silicon chip from tryptic digests of β-casein. The sequence and the phosphorylation sites of the phosphopeptides are listed in Table 2.

As shown in FIG. 2 and FIG. 3, the phosphopeptides from tryptic digests of phosphoproteins of α-Casein and β-casein can be specifically captured by zirconium phosphonate modified porous silicon chip, and non-phosphopeptides are not retained and so removed. This indicated that zirconium phosphonate modified surface can specifically enrich phosphopeptide from complex mixture of peptides.

COMPARATIVE EXAMPLE 1

Comparing with Immobilized Metal Affinity Chromatographic (IMAC) Beads (1) Phosphopeptide Enrichment and MALDI-TOF MS Detection IMAC bead with $Fe^{3+}$ is the most widely used method for the isolation and enrichment of phosphopeptide. The enrichment of phosphopeptides by IMAC beads (POROS 20 MC beads from PerSeptive Biosystems (Framingham, Mass., USA)) is performed as manual instructions. After loading of $Fe^{3+}$, the IMAC beads are suspended in loading buffer of 0.1% acetic acid at concentration of 30 mg/mL. An aliquot of IMAC solution (10 μL) is mixed with 10 μL of protein digest in loading buffer, and the resulting solution is incubated for 30 min with constant rotation. After incubation, the IMAC beads are washed with aceonitrile/water/acetic acid (25:74:1, v/v/v) twice to remove non-specifically adsorbed peptides. The bound of phosphopeptides is eluted using 10 μL of $NH_4OH$ (pH 10.5), lyophilized to dryness. To the tube 2 μL of DHB solution containing 1% $H_3PO_4$ is added into a tube and 0.5 μL solution is deposited on the target and dried at a room temperature for MALDI-TOF MS analysis. The procedures of zirconium phosphonate modified ZrP-pSi is the same as the example 1 described. The sample is the mixture of tryptic digest of β-casein and BSA with the molar ratio of 1:10.

(2) Analytical Result

Figure 4:
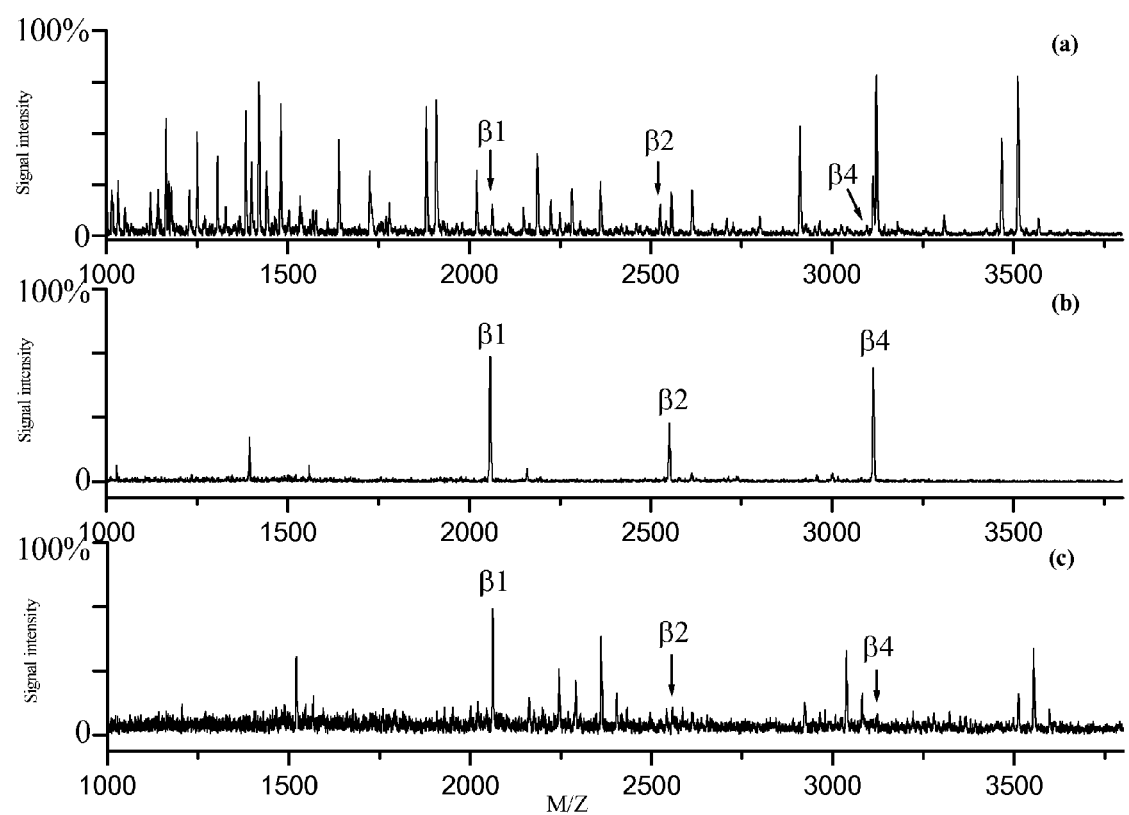
FIG. 4 is MALDI mass spectra of the enriched phosphopeptides captured by zirconium phosphonate modified porous silicon chip and commercial available IMAC beads respectively. The sequence and the phosphorylation sites of the phosphopeptides are listed in Table 2. Wherein (a) is MALDI mass spectrum of direct analysis of the tryptic digests of β-casein and BSA with molar ration of 1:10 without any pretreatment; (b) is MALDI mass spectrum of the phosphopeptides enriched from the tryptic digests of β-casein and BSA with molar ration of 1:10 by zirconium phosphonate modified porous silicon chip; (c) is MALDI mass spectrum of the phosphopeptides enriched from the tryptic digests of β-casein and BSA with molar ration of 1:10 by commercial available IMAC beads. The sequence of phosphopeptides is listed in Table 2.

The obtained spectra were shown in the FIG. 4. Large amount of non-phosphopeptides were presented in the sample. It is very obvious that many non-phosphopeptides are still retained by IMAC beads due to the poor specificity. However, for the zirconium phosphonate modified chip, only phosphopeptides were basicly retained which indicated the high specificity of the zirconium phosphonate modified surface for phosphopeptides.

2. Enrichment of Phosphopeptide by Zirconium Phosphonate Modified Chromatographic Media In this mode, chromatography media is modified with zirconium phosphate and applied to enrich and purify phosphopeptide. In the present embodiment, porous silica gel is modified with zirconium phosphonate for enriching phosphopeptide. However, the chromatography media is not limited to the silica gel. Others chromatography matrixes such as agarose particle, organic polymer particle, inorganic particle and organic or inorganic polymer monolithic column media are also used. The eluted phosphopeptides can be directly detected by mass spectrometric detector, and or also further separated prior to detection.

EXAMPLE 2

Silica Gel Modified with Zirconium Phosphonate Used for Enrichment of Phosphopeptides 1. Preparation of Zirconium Phosphonate Modified Silica Gel The silica gel was placed in 50 mL of 20% HCl solution at 110° C. with stirring and for 4 h. Then the solution was filtered, and the silica gel was washed with deionized water until at pH 7.0. Then, silica gel was dried in vacuum at 110° C. overnight. The dried silica gel was placed in 50 mL toluene with stirring under $N_2$, and subsequently 3 mL 3-aminopropyl-triethoxysilane was added for reaction at 120° C. for 12 h under $N_2$. Then the toluene was filtered and the obtained aminopropyl modified silica gel was washed respectively with toluene and acetone for several times. The silica gel was placed in vacuum at 60° C. for overnight for further usage. The 2 g of obtained aminopropyl modified silica gel was further transferred into phosphonate modified porous silica surface by reaction in a solution prepared by adding 0.15 mL of $POCl_3$ and 0.21 mL of 2,4,6-collidine in 50 mL anhydrous acetonitrile for 12 h at room temperature, and followed by rinsing with ACN and deionized water for five times. The phosphonate modified silica gel was dried at vacuum overnight and then stored in desiccator for further use. The phosphate modified silica gel was incubated in 40 mL of 200 mM $ZrOCl_2$ solution with stirring for 12 h for generation of zirconium phosphonate modified silica gel. Then, the solid was filtered, washed with deionized water for five times, and then dried vacuum overnight at 60° C. The 10 mg of zirconium phosphonate modified silica gel was packed into a solid phase column with inner diameter of 0.5 mm for further use.

2. Preparation of Sample and Analysis of Captured Phosphopeptide

Tryptic digests of α-Casein and β-casein ($10^{-6}$M) were diluted by 1% HAC with 100 times respectively, and then 100 μL tryptic digestion was loading onto the solid phase extraction column packed with zirconium phosphonate modified silica gel particles. After that, the solid phase extraction column was washed by 300 μL of 500 mM NaCl, 1% HAC solution, and followed by washing with 300 μL of 75% ACN, 1% HAC solution, and then washed by 300 μL of 1% HAC solution. Lastly, 300 μL of 1% $NH_4OH$ was used to elute the phosphopeptide captured by solid phase extraction column, and the solution was collected and lyophilized to dryness. 2 μL DHB solution (25 mg/mL) containing 1% $H_3PO_4$ was introduced into the tube, and 0.5 μL of the mixture was deposited on the MALDI target for MALDI MS analysis.

3. Analytical Result

Figure 5:
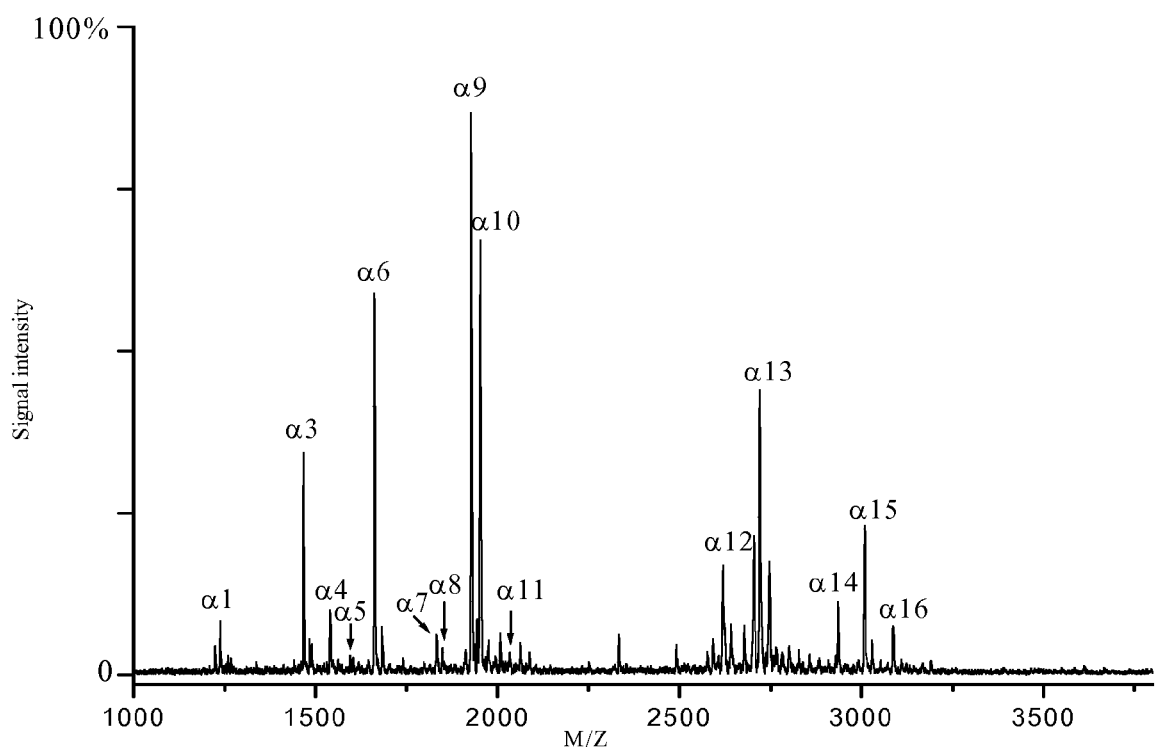
FIG. 5 is MALDI mass spectrum for the enriched and purified phosphopeptides by zirconium phosphonate modified silica gel from tryptic digest of α-casein.
Figure 6:
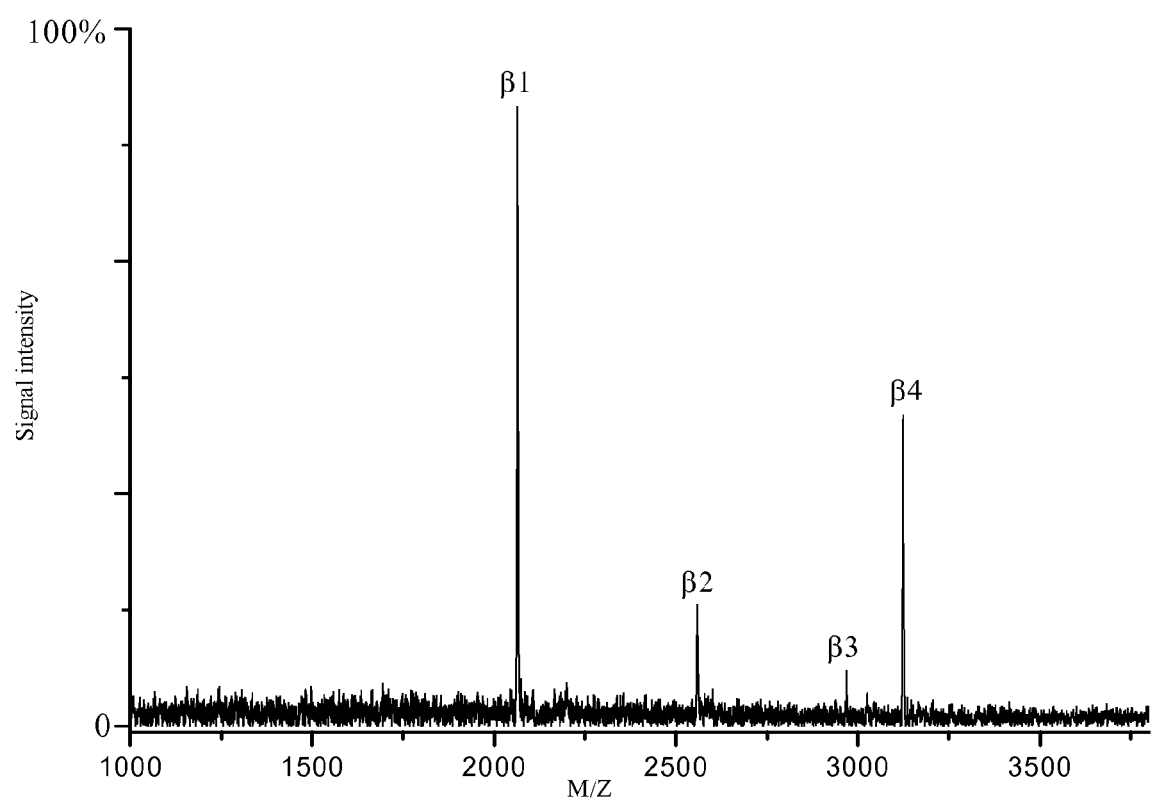
FIG. 6 is MALDI mass spectrum for the enriched and purified phosphopeptides by zirconium phosphonate modified silica gel from tryptic digest of β-casein.

As shown in the FIG. 5 and FIG. 6, the phosphopeptides from tryptic digests of α-Casein and β-casein can specifically captured by zirconium phosphonate modified silica gel, and non-phosphopeptides were not retained and eluted. In summary, the chromatography media modified zirconium phosphonate can be used to specifically enrich and purify phosphopeptides from complex mixture of peptides.

TABLE 1

Phosphopeptides isolated from the tryptic digest of Phosphopeptides isolated from the tryptic digest of α-Casein by zirconium phosphonate modified porous silicon wafer.

| No. | [M + H]⁺ | Phosphorylation site | Amino acid sequence |
|---|---|---|---|
| α1 | 1237.50 | 1 | TVDMLE[$_p$S]TEVF |
| α2 | 1331.53 | 2 | EQL[$_p$S]T[$_p$S]EENSK |
| α3 | 1466.61 | 1 | TVDME[$_p$S]TEVFTK |
| α4 | 1539.70 | 2 | EQL[$_p$S]T[$_p$S]EENSKK |
| α5 | 1594.69 | 1 | TVDME[$_p$S]TEVFTK |
| α6 | 1660.79 | 1 | VPQLEIVPN[$_p$S]AEER |
| α7 | 1832.83 | 1 | YLGEYLIVPN[$_p$S]AEER |
| α8 | 1847.69 | 1 | DIG[$_p$S]ESTEDQAMEDIK |
| α9 | 1927.69 | 2 | DIG[$_p$S]E[$_p$S]TEDQAMEDIK |
| α10 | 1951.95 | 1 | YKVPQLEIVPN[$_p$S]AEER |
| α11 | 2079.04 | 1 | KKYKVPQLEIVPN[$_p$S]AEERL |
| α12 | 2619.04 | 4 | NTMEHV[$_p$S][$_p$S][$_p$S]EESII[$_p$S]QETYK |

TABLE 1-continued

Phosphopeptides isolated from the tryptic digest of Phosphopeptides isolated from the tryptic digest of α-Casein by zirconium phosphonate modified porous silicon wafer.

| No. | [M + H]⁺ | Phosphorylation site | Amino acid sequence |
|---|---|---|---|
| α13 | 2720.91 | 5 | QMEAE[$_p$S]I[$_p$S][$_p$S][$_p$S]EEIVPNPN[$_p$S]VEQK |
| α14 | 2935.15 | 3 | KEKVNEL[$_p$S]KDIG[$_p$S]E[$_p$S]TEDQAMEDIKQ |
| α15 | 3008.01 | 4 | NANEEEYSIG[$_p$S][$_p$S][$_p$S]EE[$_p$S]AEVATEEVK |
| α16 | 3087.99 | 5 | NANEEEY[$_p$S]IG[$_p$S][$_p$S][$_p$S]EE[$_p$S]AEVATEEVK |

The sequence listing identifiers of the amino acid sequences α1 to α16 as listed in Table 1 are SEQ ID NOs:1-16, respectively.

TABLE 2

Phosphopeptides isolated from the tryptic digest of β-casein by zirconium phosphonate modified porous silicon wafer.

| No. | [M + H]⁺ | Phosphorylation site | Amino acid sequence |
|---|---|---|---|
| β1 | 2061.83 | 1 | FQ[$_p$S]EEQQQTEDELQK |
| β2 | 2556.09 | 1 | FQ[$_p$S]EEQQQTEDELQDKIHPF |
| β3 | 2965.15 | 4 | ELEELNVPGEIVEpSLpSpSpSEESITR |
| β4 | 3122.27 | 4 | RELEELNVPGEIVE[$_p$S]L[$_p$S][$_p$S][$_p$S]EESITR |

The sequence listing identifiers of the amino acid sequences β1 to β4 as listed in Table 1 are SEQ ID NOs:17-20, respectively.

We claim:

1. A method for isolation and enrichment of phosphopeptides from a complex mixture of peptides which comprises
contacting a surface of a chip modified with zirconium phosphonate with the complex mixture;
retaining the phosphate group of the phosphopeptides on the surface of the matrix by the strong interaction between the phosphate groups on the phosphopeptides and zirconium ions on the surface; and
removing any non-phosphopeptides which are not retained by the zirconium ions on the surface.

2. The method of claim 1, wherein the surface is prepared by covalently bonding phosphate groups to the surface and then immobilizing zirconium ions thereto.

3. The method of claim 1, wherein the chip is a porous silicon chip.

4. The method of claim 1, wherein the chip is made of a polymer, quartz, a glass, or a metal.

5. The method of claim 1, and further comprising eluting the phosphopeptides from the matrix.

* * * * *

SEQUENCE LISTING

```
<160> NUMBER OF SEQ ID NOS: 20

<210> SEQ ID NO 1
<211> LENGTH: 9
<212> TYPE: PRT
<213> ORGANISM: A-casein
<220> FEATURE:
<221> NAME/KEY: CONFLICT
<222> LOCATION: (1)..(9)
<223> OTHER INFORMATION:

<400> SEQUENCE: 1

Thr Val Asp Met Glu Thr Glu Val Phe
1               5

<210> SEQ ID NO 2
<211> LENGTH: 9
<212> TYPE: PRT
<213> ORGANISM: A-casein
```

```
<220> FEATURE:
<221> NAME/KEY: CONFLICT
<222> LOCATION: (1)..(9)
<223> OTHER INFORMATION:

<400> SEQUENCE: 2

Glu Gln Leu Thr Glu Glu Asn Ser Lys
1               5

<210> SEQ ID NO 3
<211> LENGTH: 11
<212> TYPE: PRT
<213> ORGANISM: A-casein
<220> FEATURE:
<221> NAME/KEY: CONFLICT
<222> LOCATION: (1)..(11)
<223> OTHER INFORMATION:

<400> SEQUENCE: 3

Thr Val Asp Met Glu Thr Glu Val Phe Thr Lys
1               5                   10

<210> SEQ ID NO 4
<211> LENGTH: 10
<212> TYPE: PRT
<213> ORGANISM: A-casein
<220> FEATURE:
<221> NAME/KEY: CONFLICT
<222> LOCATION: (1)..(10)
<223> OTHER INFORMATION:

<400> SEQUENCE: 4

Glu Gln Leu Thr Glu Glu Asn Ser Lys Lys
1               5                   10

<210> SEQ ID NO 5
<211> LENGTH: 11
<212> TYPE: PRT
<213> ORGANISM: A-casein
<220> FEATURE:
<221> NAME/KEY: CONFLICT
<222> LOCATION: (1)..(11)
<223> OTHER INFORMATION:

<400> SEQUENCE: 5

Thr Val Asp Met Glu Thr Glu Val Phe Thr Lys
1               5                   10

<210> SEQ ID NO 6
<211> LENGTH: 13
<212> TYPE: PRT
<213> ORGANISM: A-casein
<220> FEATURE:
<221> NAME/KEY: CONFLICT
<222> LOCATION: (1)..(13)
<223> OTHER INFORMATION:

<400> SEQUENCE: 6

Val Pro Gln Leu Glu Ile Val Pro Asn Ala Glu Glu Arg
1               5                   10

<210> SEQ ID NO 7
<211> LENGTH: 14
<212> TYPE: PRT
<213> ORGANISM: A-casein
<220> FEATURE:
<221> NAME/KEY: CONFLICT
<222> LOCATION: (1)..(14)
<223> OTHER INFORMATION:
```

-continued

```
<400> SEQUENCE: 7

Tyr Leu Gly Glu Tyr Leu Ile Val Pro Asn Ala Glu Glu Arg
1               5                   10

<210> SEQ ID NO 8
<211> LENGTH: 15
<212> TYPE: PRT
<213> ORGANISM: A-casein
<220> FEATURE:
<221> NAME/KEY: CONFLICT
<222> LOCATION: (1)..(15)
<223> OTHER INFORMATION:

<400> SEQUENCE: 8

Asp Ile Gly Glu Ser Thr Glu Asp Gln Ala Met Glu Asp Ile Lys
1               5                   10                  15

<210> SEQ ID NO 9
<211> LENGTH: 14
<212> TYPE: PRT
<213> ORGANISM: A-casein
<220> FEATURE:
<221> NAME/KEY: CONFLICT
<222> LOCATION: (1)..(14)
<223> OTHER INFORMATION:

<400> SEQUENCE: 9

Asp Ile Gly Glu Thr Glu Asp Gln Ala Met Glu Asp Ile Lys
1               5                   10

<210> SEQ ID NO 10
<211> LENGTH: 15
<212> TYPE: PRT
<213> ORGANISM: A-casein
<220> FEATURE:
<221> NAME/KEY: CONFLICT
<222> LOCATION: (1)..(15)
<223> OTHER INFORMATION:

<400> SEQUENCE: 10

Tyr Lys Val Pro Gln Leu Glu Ile Val Pro Asn Ala Glu Glu Arg
1               5                   10                  15

<210> SEQ ID NO 11
<211> LENGTH: 18
<212> TYPE: PRT
<213> ORGANISM: A-casein
<220> FEATURE:
<221> NAME/KEY: CONFLICT
<222> LOCATION: (1)..(18)
<223> OTHER INFORMATION:

<400> SEQUENCE: 11

Lys Lys Tyr Lys Val Pro Gln Leu Glu Ile Val Pro Asn Ala Glu Glu
1               5                   10                  15

Arg Leu

<210> SEQ ID NO 12
<211> LENGTH: 16
<212> TYPE: PRT
<213> ORGANISM: A-casein
<220> FEATURE:
<221> NAME/KEY: CONFLICT
<222> LOCATION: (1)..(16)
<223> OTHER INFORMATION:

<400> SEQUENCE: 12
```

```
Asn Thr Met Glu His Val Glu Glu Ser Ile Ile Gln Glu Thr Tyr Lys
1               5                   10                  15
```

<210> SEQ ID NO 13
<211> LENGTH: 18
<212> TYPE: PRT
<213> ORGANISM: A-casein
<220> FEATURE:
<221> NAME/KEY: CONFLICT
<222> LOCATION: (1)..(18)
<223> OTHER INFORMATION:

<400> SEQUENCE: 13

```
Gln Met Glu Ala Glu Ile Glu Glu Ile Val Pro Asn Pro Asn Val Glu
1               5                   10                  15

Gln Lys
```

<210> SEQ ID NO 14
<211> LENGTH: 23
<212> TYPE: PRT
<213> ORGANISM: A-casein
<220> FEATURE:
<221> NAME/KEY: CONFLICT
<222> LOCATION: (1)..(23)
<223> OTHER INFORMATION:

<400> SEQUENCE: 14

```
Lys Glu Lys Val Asn Glu Leu Lys Asp Ile Gly Glu Thr Glu Asp Gln
1               5                   10                  15

Ala Met Glu Asp Ile Lys Gln
            20
```

<210> SEQ ID NO 15
<211> LENGTH: 21
<212> TYPE: PRT
<213> ORGANISM: A-casein
<220> FEATURE:
<221> NAME/KEY: CONFLICT
<222> LOCATION: (1)..(21)
<223> OTHER INFORMATION:

<400> SEQUENCE: 15

```
Asn Ala Asn Glu Glu Glu Tyr Ser Ile Gly Glu Glu Ala Glu Val Ala
1               5                   10                  15

Thr Glu Glu Val Lys
            20
```

<210> SEQ ID NO 16
<211> LENGTH: 20
<212> TYPE: PRT
<213> ORGANISM: A-casein
<220> FEATURE:
<221> NAME/KEY: CONFLICT
<222> LOCATION: (1)..(20)
<223> OTHER INFORMATION:

<400> SEQUENCE: 16

```
Asn Ala Asn Glu Glu Glu Tyr Ile Gly Glu Glu Ala Glu Val Ala Thr
1               5                   10                  15

Glu Glu Val Lys
            20
```

<210> SEQ ID NO 17
<211> LENGTH: 14
<212> TYPE: PRT

```
<213> ORGANISM: A-casein
<220> FEATURE:
<221> NAME/KEY: CONFLICT
<222> LOCATION: (1)..(14)
<223> OTHER INFORMATION:

<400> SEQUENCE: 17

Phe Gln Glu Glu Gln Gln Gln Thr Glu Asp Glu Leu Gln Lys
1               5                   10

<210> SEQ ID NO 18
<211> LENGTH: 19
<212> TYPE: PRT
<213> ORGANISM: A-casein
<220> FEATURE:
<221> NAME/KEY: CONFLICT
<222> LOCATION: (1)..(19)
<223> OTHER INFORMATION:

<400> SEQUENCE: 18

Phe Gln Glu Glu Gln Gln Gln Thr Glu Asp Glu Leu Gln Asp Lys Ile
1               5                   10                  15

His Pro Phe

<210> SEQ ID NO 19
<211> LENGTH: 20
<212> TYPE: PRT
<213> ORGANISM: A-casein
<220> FEATURE:
<221> NAME/KEY: CONFLICT
<222> LOCATION: (1)..(20)
<223> OTHER INFORMATION:

<400> SEQUENCE: 19

Glu Leu Glu Glu Leu Asn Val Pro Gly Glu Ile Val Glu Leu Glu Glu
1               5                   10                  15

Ser Ile Thr Arg
            20

<210> SEQ ID NO 20
<211> LENGTH: 29
<212> TYPE: PRT
<213> ORGANISM: A-casein
<220> FEATURE:
<221> NAME/KEY: CONFLICT
<222> LOCATION: (1)..(29)
<223> OTHER INFORMATION:

<400> SEQUENCE: 20

Arg Glu Leu Glu Glu Leu Asn Val Pro Gly Glu Ile Val Glu Pro Ser
1               5                   10                  15

Leu Pro Ser Pro Ser Pro Ser Glu Glu Ser Ile Thr Arg
            20                  25
```